US012657147B2

(12) United States Patent (10) Patent No.: US 12,657,147 B2

Pelissier et al. (45) Date of Patent: Jun. 16, 2026

(54) INTERFACE CIRCUIT AND METHOD

(71) Applicant: STMicroelectronics International N.V., Geneva (CH)

(72) Inventors: Gilles Pelissier, Champagnier (FR); Nicolas Anquet, Grenoble (FR)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/617,945

(22) Filed: Mar. 27, 2024

(65) Prior Publication Data

US 2024/0330223 A1     Oct. 3, 2024

(30) Foreign Application Priority Data

Mar. 31, 2023     (FR) ...................................... 2303152

(51) Int. Cl.
G06F 13/40     (2006.01)

(52) U.S. Cl.
CPC ...... G06F 13/4027 (2013.01); G06F 2213/40 (2013.01)

(58) Field of Classification Search
CPC .......................... G06F 13/4027; G06F 2213/40
See application file for complete search history.

(56) References Cited

U.S. PATENT DOCUMENTS

| | | | |
|---|---|---|---|
| 6,708,273 B1 | 3/2004 | Ober et al. | |
| 8,180,928 B2 * | 5/2012 | Elzur | .................... H04L 69/168 |
| | | | 709/212 |
| 8,832,460 B2 * | 9/2014 | Iizuka | ................... H04L 9/0643 |
| | | | 713/193 |
| 8,904,076 B2 * | 12/2014 | Fernald | ............... G06F 13/4027 |
| | | | 710/305 |
| 9,384,086 B1 * | 7/2016 | Craddock | ............... G06F 13/00 |
| 10,366,024 B2 * | 7/2019 | Craddock | ........... G06F 12/1027 |
| 11,468,119 B2 | 10/2022 | Lee | |
| 11,593,195 B2 * | 2/2023 | Brandon | .............. G11C 7/1075 |
| 11,669,625 B2 * | 6/2023 | Durham | ................. G06F 21/79 |
| | | | 726/26 |

(Continued)

FOREIGN PATENT DOCUMENTS

| | | |
|---|---|---|
| EP | 1870814 A1 | 12/2007 |
| EP | 2437198 A1 | 4/2012 |

(Continued)

OTHER PUBLICATIONS

INPI Search Report and Written Opinion for priority application, FR 2303152, report dated Oct. 2, 2023, 9 pgs.

*Primary Examiner* — Henry Tsai
*Assistant Examiner* — Christopher A Daley
(74) *Attorney, Agent, or Firm* — Crowe & Dunlevy LLC

(57) ABSTRACT

A coupling and chaining bridge is configured to receive an original data value via a first bus coupled to one of a system bus of an electronic device and a first peripheral circuit of the electronic device. The original data value is transmitted by the coupling and chaining bridge to a second bus of the electronic device coupled to the other of the system bus and the first peripheral circuit. The coupling and chaining bridge is further configured to intercept the original data value and transmit a copy of the original data value to a third bus of the device that is coupled to a second peripheral circuit of the device.

22 Claims, 7 Drawing Sheets

(56)          References Cited

U.S. PATENT DOCUMENTS

| | | |
|---|---|---|
| 12,117,949 B2 * | 10/2024 | Nandlinger ........... G06F 9/3877 |
| 2010/0071055 A1 | 3/2010 | Kaniz et al. |
| 2012/0008768 A1 | 1/2012 | Mundra et al. |
| 2014/0229739 A1 | 8/2014 | Roth et al. |
| 2016/0007071 A1 | 1/2016 | Burckard |
| 2019/0245686 A1 * | 8/2019 | Rahimi ................... G06F 21/72 |
| 2019/0319781 A1 | 10/2019 | Chhabra et al. |
| 2020/0403779 A1 | 12/2020 | Gopal et al. |
| 2022/0262448 A1 | 8/2022 | Kim et al. |
| 2023/0317137 A1 | 10/2023 | Li et al. |
| 2023/0342044 A1 | 10/2023 | Hong et al. |
| 2024/0078151 A1 | 3/2024 | Chao et al. |
| 2024/0256390 A1 | 8/2024 | Imtiaz et al. |

FOREIGN PATENT DOCUMENTS

| | | |
|---|---|---|
| WO | 0117163 A1 | 3/2001 |
| WO | 2020190776 A1 | 9/2020 |

* cited by examiner

IP CONFIGURATION ⟶ 400

CCB CONFIGURATION ⟶ 401

DMA CHANNELS CONFIGURATION ⟶ 402

DMA TRANSFERS ⟶ 403

CRC RESULT ⟶ 404

INTERFACE CIRCUIT AND METHOD

PRIORITY CLAIM

This application claims the priority benefit of French Application for Patent No. 2303152, filed on Mar. 31, 2023, the content of which is hereby incorporated by reference in its entirety to the maximum extent allowable by law.

TECHNICAL FIELD

The present disclosure generally relates to electronic circuits and, in particular, to an interface circuit for peripheral circuits.

BACKGROUND

Some operations of data treatment imply several peripheral circuits. For example, a cryptographic operation can be associated with an operation of generation or control of a cyclic redundancy code (CRC). When a data value from an electronic device is transmitted to a cryptographic circuit, it can be transmitted to a generation and/or control circuit for a redundancy code as well. The cyclic redundancy code is an error checking code allowing to verify whether the data value has undergone alterations during its transferring and/or storage.

A problem with existing implementations of such operations, implying two peripheral circuits, is that they are associated to relatively long treatment duration and/or relatively high-power consumption.

SUMMARY

One embodiment provides a coupling and chaining bridge circuit configured to receive, via a first bus coupled to one of a system bus of an electronic device and a first peripheral circuit of the electronic device, an original data value and to transmit it to a second bus of the electronic device coupled to the other among the system bus and the first peripheral circuit, the coupling and chaining bridge circuit being further configured to intercept the original data value and transmit a copy of the original data value to a third bus of the device coupled to a second peripheral circuit of the device.

According to an embodiment, the above circuit is further configured to generate a write access request for the copy of the original data value to the second circuit based on the reception of the original data value.

According to an embodiment, the first bus is coupled to the system bus and the second bus is coupled to the first peripheral circuit, wherein the original data value is transmitted to the circuit based on a write access request of the first circuit.

According to an embodiment, the first bus is coupled to the first peripheral circuit and the second bus is coupled to the system bus, wherein the original data value is transmitted to the circuit based on a read access request of the first circuit.

According to an embodiment, the above circuit comprises a volatile memory coupled to the second peripheral circuit, which is configured to receive the copy of the transmitted data value and to provide it to the second peripheral circuit.

According to an embodiment, the volatile memory is a first in first out memory.

One embodiment provides an electronic device comprising: the above coupling and chaining bridge circuit; the first and second peripheral circuits; and the system bus.

According to an embodiment, the coupling and chaining bridge circuit is a circuit for direct access to the memory.

According to an embodiment, the second peripheral circuit is a cyclic redundancy check circuit configured to calculate an error code based on the data value provided by the coupling and chaining bridge circuit.

According to an embodiment, the first peripheral circuit is a cryptographic circuit.

According to an embodiment, the cryptographic circuit is configured to generate an execution error code indicating whether an execution error occurred.

According to an embodiment, the coupling and chaining bridge circuit further comprises a volatile memory coupled to the second peripheral circuit and configured to receive the copy of the transmitted data value and to provide it to the second peripheral circuit, wherein the coupling and chaining bridge circuit is further configured to delete the content of the volatile memory based on the execution error code.

According to an embodiment, the above electronic device further comprises a third peripheral circuit coupled to the coupling and chaining bridge circuit via a fourth bus, wherein the coupling and chaining bridge circuit is further configured to transmit a copy of the original data value to the fourth bus.

One embodiment provides a process of coupling and chaining comprising: the reception, by the coupling and chaining bridge circuit and via a first bus coupled to one among a system bus of an electronic device and a first peripheral circuit of the electronic device, of an original data value; the transmission, by the coupling and chaining bridge circuit and to a second bus of the electronic device coupled to the other among the system bus and the first peripheral circuit; the interception, by the coupling and chaining bridge, of the original data value; and the transmission, by the coupling and chaining bridge circuit, of a copy of the original data value to a third bus of the device coupled to a second peripheral circuit of the device.

According to an embodiment, a write access request to the second peripheral circuit of the copy of the original data value is generated by the coupling and chaining bridge circuit based on the reception of the original data value.

According to an embodiment, the coupling and chaining bridge circuit generates the write access request to the second peripheral circuit based on a write or read access request in the first peripheral circuit.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the calculation of error codes by a cyclic redundancy checking circuit and the use of the error codes are not described in details.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
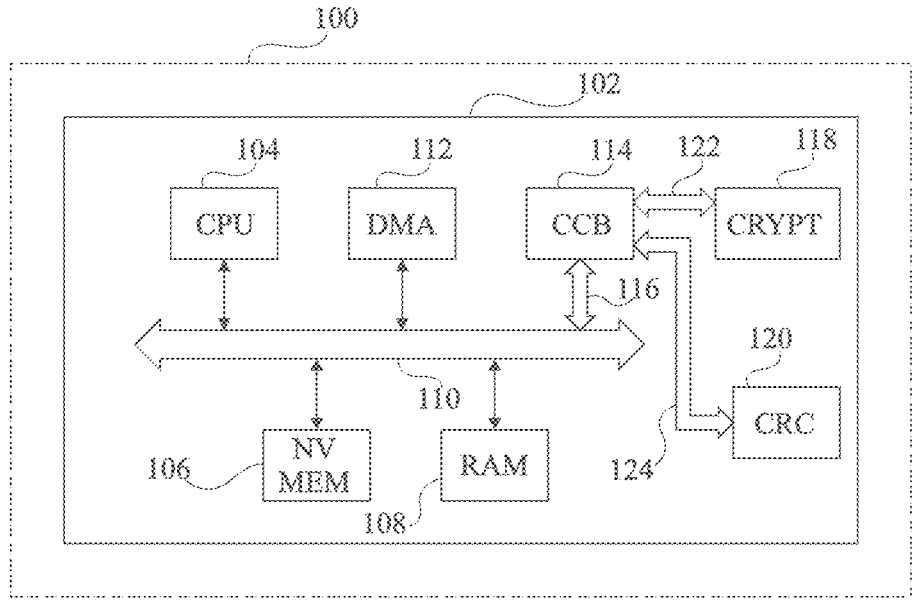
FIG. 1 is a block diagram of an electronic device according to an embodiment of the present disclosure.

FIG. 1 is a block diagram of an electronic device 100 comprising an integrated circuit 102 according to an embodiment of the present disclosure.

The electronic device 100 is, for example, a mobile electronic device, such as a cellular phone, or an electronic card, such as a microcircuit card. For example, the electronic device 100 is a microcircuit card implementing an electronic key that controls the opening and/or closing of a car or any other vehicle. In another example, the electronic device 100 is a device that controls home automation devices, etc.

The circuit 102 comprises, for example, a processor 104 (CPU) coupled to a non-volatile memory 106 (NV MEM) and to a volatile memory 108 (RAM) via a system bus 110. As an example, the memory 106 is a Flash-type memory, and the memory 108 is a volatile memory, for example a RAM-type memory (Random Access Memory).

The circuit 102 further comprises, for example, a direct access circuit to the memory 112 (DMA) coupled to the bus 110.

According to an embodiment, the circuit 102 further comprises a coupling and chaining bridge circuit 114 (CCB) coupled to the bus 110 via a bus 116. In another example, the coupling and chaining bridge circuit 114 is a circuit for direct access to the memory, for example similar to the circuit 112, wherein, in this case, for example, the circuit 112 is omitted. The bus 116 is, for example, an Advanced High-performance Bus (AHB). In other examples, the bus 116 is an Advanced Peripheral Bus (APB) or Advanced External Interface (AXI).

The circuit 102 further comprises, for example, a cryptographic circuit 118 (CRYPT) and a control circuit of a cyclic redundancy code 120 (CRC). The circuits 118 and 120 are respectively coupled to the coupling and chaining bridge circuit 114 via the buses 122 and 124. For example, the circuits 118 and 120 are not directly coupled to the bus 110, but are coupled to the bus 110 only via the circuit 114. For example, the buses 122 and 124 are AHB buses. For example, the buses 122 and 124 are APB or AXI buses.

Although the circuits 118 and 120 are illustrated as a cryptographic circuit and a cyclic redundancy checking circuit, other types of peripheral circuits can be considered. Thus, as a rule, the coupling and chaining circuit 114 is coupled to a first peripheral circuit via the bus 122, such that, for example, a cryptographic circuit, and a second peripheral circuit via the bus 124 such that, for example, a control circuit of cyclic redundancy.

According to an embodiment, the coupling and chaining bridge circuit 114 is configured to perform a coupling operation. During a coupling operation, the coupling and chaining bridge circuit 114 is configured to receive an original data value from the system bus 110 via the bus 116 and transmit it to the peripheral circuit 118 via the bus 122. The coupling and chaining bridge circuit 114 is further configured to intercept the original data value and transmit a copy of the original data value to the bus 124 that is coupled to the peripheral circuit 120.

Alternatively, or additionally, the coupling and chaining bridge circuit 114 is configured to perform a chaining operation. During a chaining operation, the coupling and chaining bridge circuit 114 is configured to receive an original data value from the peripheral circuit 118 via the bus 122 and transmit it to the system bus 110 via the bus 116. The coupling and chaining bridge circuit 114 is further configured to intercept the original data value and transmit a copy of the original data value to the bus 124 that is coupled to the peripheral circuit 120.

For example, the circuit 102 comprises other peripheral circuits in addition to the circuit 118. Other peripheral circuits are, for example, each coupled to the coupling and chaining bridge circuit 114 via a dedicated bus. For example, the circuit 102 comprises, in addition to the circuits 118 and 120, a peripheral circuit coupled to the coupling and chaining bridge circuit 114 and configured for hacking operations.

Figure 2A:
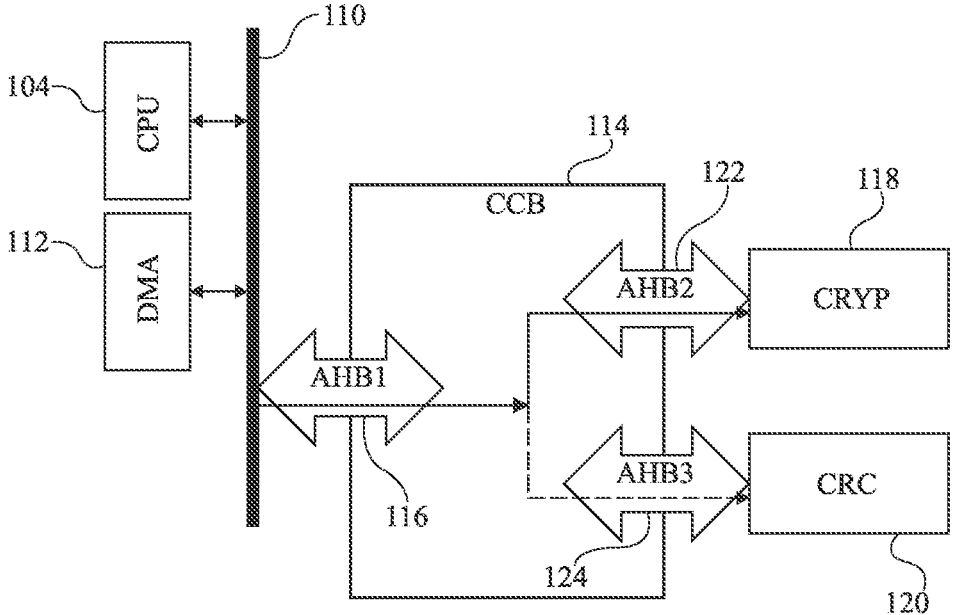
FIG. 2A is a block diagram illustrating an example of implementation of a coupling operation according to an embodiment of the present disclosure.

FIG. 2A is a block diagram that illustrates the implementation of a coupling operation by the coupling and chaining bridge circuit 114.

For example, a data value, for example stored in one of the memories 106 or 108, is transmitted to the coupling and chaining bridge circuit 114 via the bus 116 (AHB1). Then, the coupling and chaining bridge circuit 114 performs an operation called coupling, by transmitting the data value to the cryptographic circuit 118 via the bus 122 (AHB2) and, in parallel, to the control circuit of cyclic redundancy code 120, for example via the bus 124 (AHB3). For example, the data value is an encrypted data value and the cryptographic circuit 118 is, for example, configured to decode the data value, for example according to an Advanced Encryption Standard (AES) encryption or any other type of encryption. For example, the control circuit of cyclic redundancy code 120 is configured to calculate a cyclic redundancy code or any other type of error checking code from the encrypted data value, in order to detect, for example, possible future alterations to the data value, for example during a data transfer to another distant electronic device or, in another example, during its storage and/or its transfer from the coupling and chaining bridge circuit 114 to the memory 106 or 108. For example, the encrypted data value also is transmitted to the other electronic device in association with the error checking code. For example, the other device is a locking circuit of a car, or a house automation, and the data value is authentication data. For example, the other device is configured to decrypt the data value and, based on the decryption, to perform several operations. For example, the encrypted data is wirelessly transmitted by the device 100 to the other device, for example via an antenna of the device (not illustrated in FIG. 1). The encrypted data value is transmitted, for example, in association with some error checking code calculated by the control circuit of cyclic redundancy code 120. For example, the other device also comprises a control circuit of cyclic redundancy configured to calculate an error checking code based on the received encrypted data value. Then, the other device is configured, for example, to compare the two error checking codes and detect any alteration of the received encrypted data value.

In another example, the data value transmitted to the cryptographic circuit 118 and to the control circuit of cyclic redundancy code 120 after the coupling operation, is a non-encrypted data value and the control circuit of cyclic redundancy code 120 is configured to calculate an error checking code based on the non-encrypted data value.

According to an embodiment, the coupling operation is performed after sending, for example by the processor 104 or by the direct access circuit to the memory 112 with only one write access request. For example, the write access command is about writing data into a register of the cryptographic device 118, wherein the coupling and chaining bridge circuit 114 is then configured to generate another write access command into a register of the control circuit of cyclic redundancy code 120.

Figure 2B:
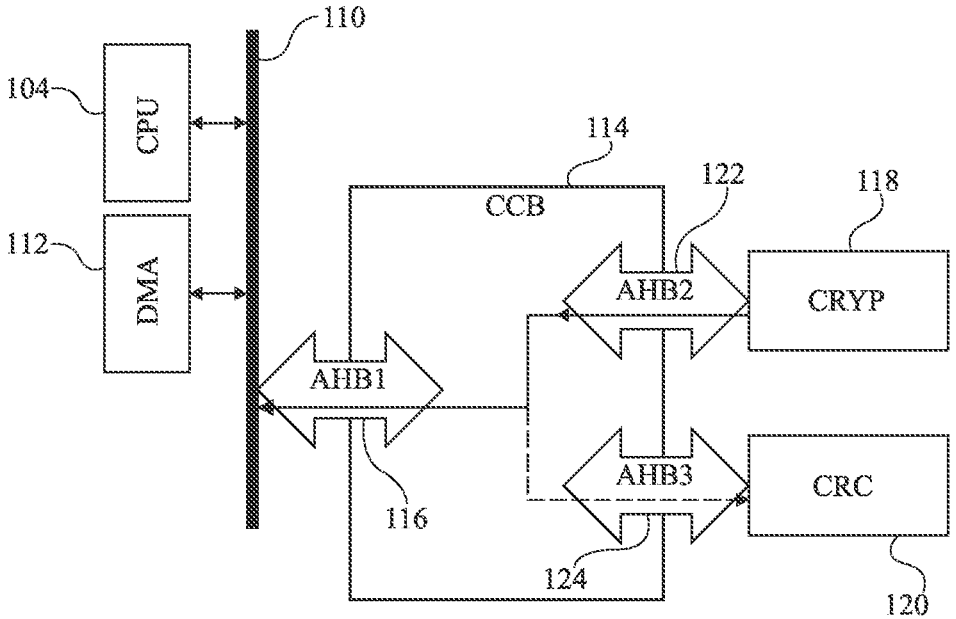
FIG. 2B is a block diagram illustrating an example of implementation of a chaining operation according to an embodiment of the present disclosure.

FIG. 2B is a block diagram that illustrates an implementation of a chaining operation by the coupling and chaining bridge circuit 114.

For example, after the decryption of an encrypted data value by the cryptographic circuit 118, the data value is transmitted to the coupling and chaining bridge circuit 114 via the bus 122. Then, the coupling and chaining bridge circuit 114 performs an operation called chaining, by transmitting the data value to the system bus 110 via the bus 116 and, in parallel, to the control circuit of cyclic redundancy code 120 via the bus 124. For example, the control circuit of cyclic redundancy code 120 is configured, for example, to calculate a cyclic redundancy code or any other type of error checking code from the encrypted data value, in order to detect, for example, possible future alterations to the data value, for example during a decoding by the cryptographic circuit 118.

In another example, the cryptographic circuit 118 is configured to encrypt a data value and transmit the encrypted data value to the coupling and chaining bridge circuit 114 via the bus 122. Then, the chaining operation consists in transmitting the encrypted data value to the system bus 110 via the bus 116 and a control circuit of cyclic redundancy code 120 via the bus 124. The error checking code is then calculated by the circuit 120 based on the encrypted data value.

According to an embodiment, the chaining operation is made, for example, after the processor 104 or the direct access circuit to the memory 112 sends only one read access command. For example, the coupling and chaining bridge circuit 114 is then configured to generate a write access command into a register of the control circuit of cyclic redundancy code 120.

In the example where other peripheral circuits, in addition to the circuits 118 and 120, are coupled to the coupling and chaining bridge circuit 114, the bridge circuit 114 is configured, for example, in response to a write or read access request via the bus 116, to generate read and write access requests onto buses that link the at least one other peripheral circuit to the coupling and chaining bridge circuit 114. These read and write access requests are, for example, transmitted to buses that link the other circuits at the same time as the one transmitted via the bus 124.

For example, in addition to the circuits 118 and to the control circuit of cyclic redundancy code 120, a circuit designed for hacking operations is further coupled to the coupling and chaining bridge circuit 114 via a dedicated bus. In this case, the coupling and chaining bridge circuit 114 is configured, for example, to intercept a data value provided by the circuit 118 or by the bus 116, and transmit a copy of this data value not only to the circuit 120, but also to this another peripheral circuit with, for example, a write access request. Thus, a hacking value is generated, in addition to the error checking code calculated by the circuit 120 based on the transmitted data value, or by the circuit 118.

Figure 3A:
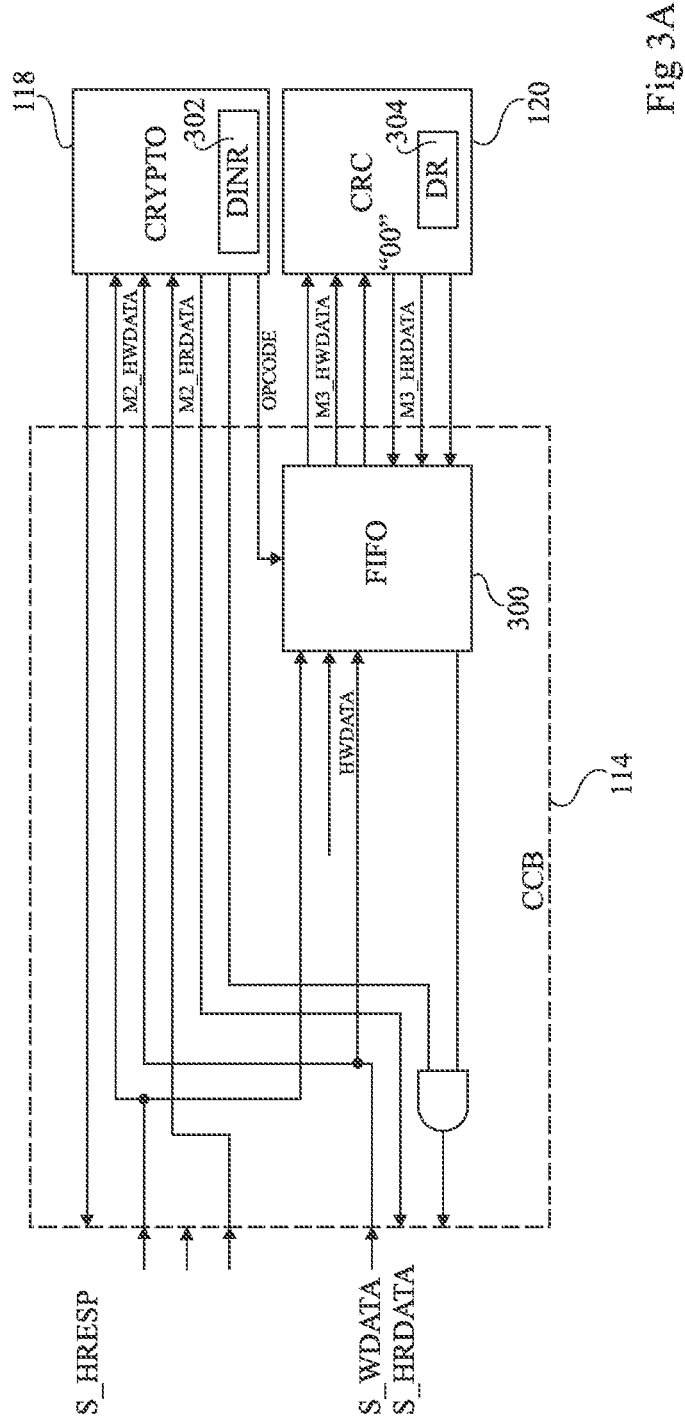
FIG. 3A illustrating an example of data treated by a control circuit during a coupling operation.

FIG. 3A illustrates an example of data treated by the coupling and chaining bridge circuit 114 during a coupling operation.

For example, the coupling and chaining bridge circuit 114 comprises a volatile memory 300 (FIFO) coupled to the bus 124. The memory 300 is, for example, a first in first out memory (FIFO) configured to store data in order of reception. For example, a write access request into the memory 300 returns the oldest stored data value in the memory 300. For example, each time a data value of the memory 300 is sent to the bus 124, the data value is deleted from the memory 300. Of course, although, the memory 300 is described as a FIFO memory in this example, other types of volatile memories can be used.

For example, the processor 104 or the circuit for direct access to the memory 112 sends a write access request for a data value CRYP1 to the cryptographic circuit 118. For example, the bus 116 comprises a data bus S_WDATA that is configured to transmit the data value to the coupling and chaining bridge circuit 114. For example, the coupling and chaining bridge circuit 114 is configured to transmit the value of the data value CRYPT1 to the cryptographic circuit 118 via a bus M2_HWDATA of the bus 122. For example, the data value CRYP1 is written into a register 302 (DINR) of the cryptographic circuit 118.

For example, the coupling and chaining bridge circuit 114 is further configured to generate a new write access command. For example, the coupling and chaining bridge circuit 114 transmits the value of the data value CRYP1 to the memory 300 via an internal bus HWDATA.

For example, the circuits 118 and 120 do not have the same computing speed. Thus, the memory 300 acts as a buffer memory to allow the circuit 120 to make calculations at its own rhythm. As an example, the memory 300 is configured to store eight 32-bit words. For example, a read access request is transmitted by the control circuit of cyclic redundancy code 120 via a bus M3_HRDATA of the bus 124 to the memory 300. The value of the data value CRYP1 is then, for example, written into a register 304 (DR) of the control circuit of cyclic redundancy code 120 via a data bus M3_HWDATA of the bus 124.

For example, the coupling and chaining bridge circuit 114 returns an execution error code, for example generated by the cryptographic 118, to the circuit of direct access to the memory 112 or to the processor 104 via a bus S_HRESP. For example, the cryptographic circuit 118 is configured to return an execution error code when a problem occurs during coding or decoding. For example, if an encryption key or a decryption key is wrong and prevents the cryptographic circuit from encrypt or decrypt a data value, the circuit 118 returns an execution error code. For example, the cryptographic circuit 118 returns an execution error code when, for any reason, it is not able to generate an output.

According to an embodiment, if a cryptographic circuit returns an execution error code, the data values in the memory 300 are deleted. As an example, the error code is transmitted to the memory 300 via a bus OPCODE.

Figure 3B:
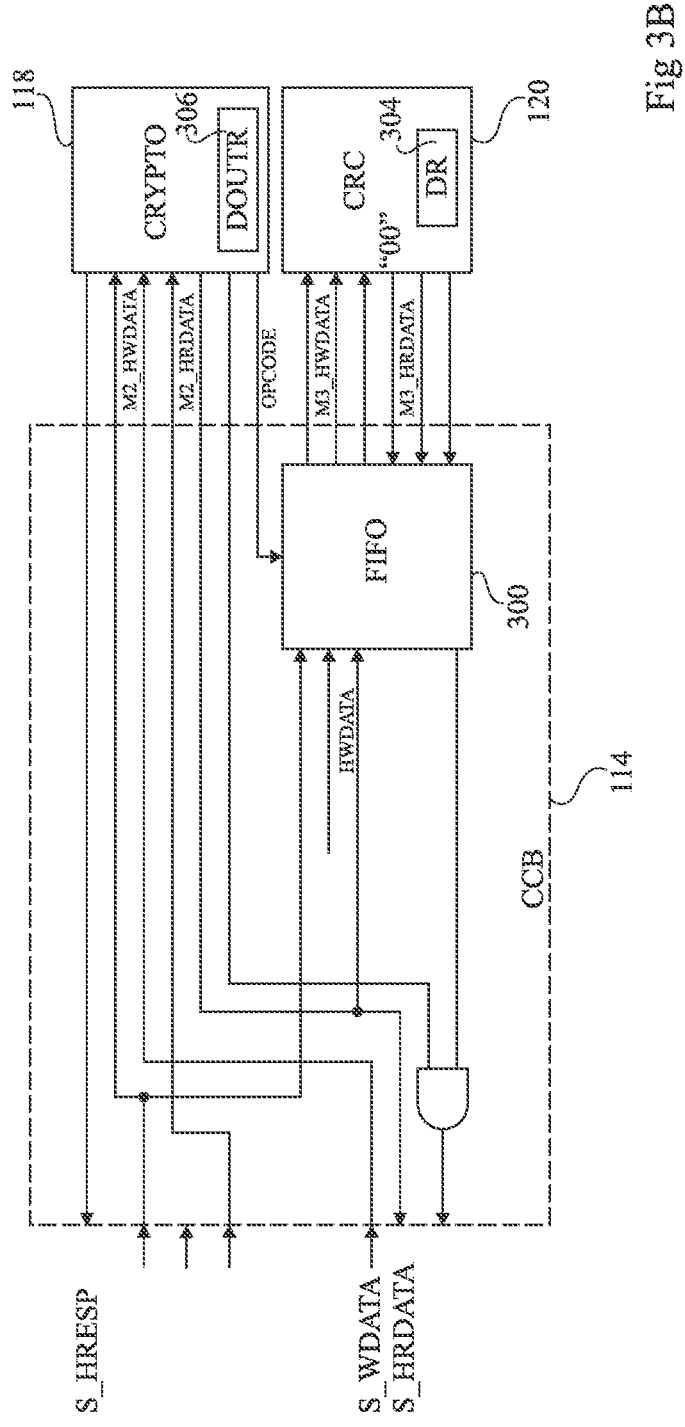
FIG. 3B illustrating an example of data treated by a control circuit during a coupling operation.

FIG. 3B illustrates an example of data treated by the coupling and chaining bridge circuit 114 during a chaining operation.

For example, the processor 104 or the circuit for direct access to the memory 112 sends a read access request for a data value out of the cryptographic circuit 118, for example stored in a register 306 (DOUTR). For example, the bus 122 comprises a data bus M2_HRDATA that is configured to transmit the data value to the coupling and chaining bridge circuit 114, then to a S_HRDATA bus of the bus 116. For example, the coupling and chaining bridge circuit 114 is configured to transmit the value of the data value from the cryptographic circuit 118 to the memory 300 via a bus HWDATA. For example, the data value is then provided to the control circuit of cyclic redundancy code 120, more specifically to the register 304, via a bus M3_HWDATA.

For example, like for the coupling operation, the coupling and chaining bridge circuit 114 returns an execution error code generated by the cryptographic 118, for example to the circuit of direct access to the memory 112 or to the processor 104 via a bus S_HRESP. For example, if the cryptographic circuit returns an execution error code, the data values in the memory 300 are deleted.

For example, the coupling and chaining bridge circuit 114 further comprises a register (not illustrated in FIGS. 3A and 3B). The register comprises, for example, a configuration value that can be programmed by the processor 104. For example, the configuration value is a one- or several-bit value. For example, the configuration value is a one-bit value, and programming the binary value as "1" tells the coupling and chaining bridge circuit 114 that the next operation is a coupling operation. Programing the binary value as "0" tells, for example, the coupling and chaining bridge circuit 114 that the next operation is a chaining operation. Of course, this example is not limitative. Programming the binary value as "1" can specify a chaining operation while programming the binary value as "0" can specify a coupling operation. In other examples, the configuration value is coded on at least two bits.

Figure 4:
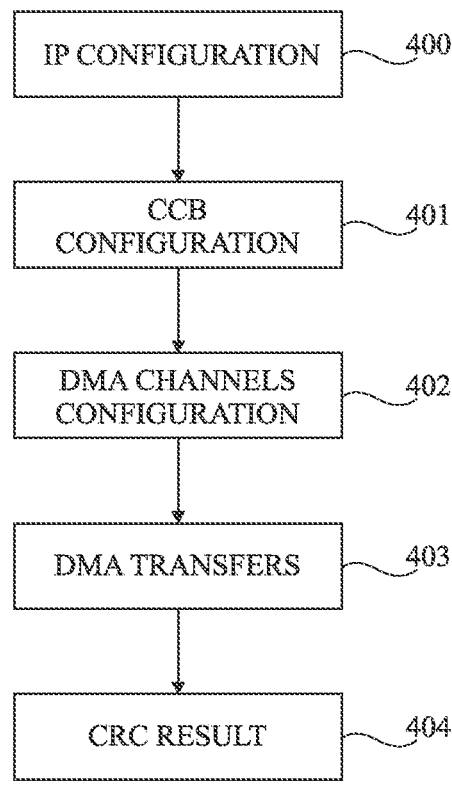
FIG. 4 is a flow diagram illustrating steps of a coupling process and/or chaining between two peripheral circuits.

FIG. 4 is a flow diagram illustrating steps of a coupling process and/or chaining process between two peripheral circuits, such as the cryptographic circuit 118 and the control circuit of cyclic redundancy code 120.

In a step 400 (IP CONFIGURATION), both circuits 118 and 120 are configured. For example, the configuration of the circuit 118 comprises the indication of a type of chaining in association with, for example, the cryptographic algorithm that was used. In the example where the used cryptographic algorithm is AES, the chaining corresponds, for example, to one of the following algorithms: AES-ECB (Electronic Codebook), AES-CBC (Cipher Block Chaining), AES-CCM (Counter with Cipher block chaining Message authentication code), AES-GCM (Galois/Counter Mode), etc. For example, the configuration of the circuit 118 comprises the indication of a size of key used by the cryptographic algorithm, for example 128, 256 in the case of AES, and for example 128, 256 or 512 bits for other algorithms. For example, the configuration of the circuit 120 comprises the indication of a type of polygons used for the cyclic redundancy calculation performed by the circuit 120. For example, the configuration of the circuit 120 further comprises the indication of the size of the error checking codes, for example that the error checking codes are codes with 32, 16 or 8 bits.

In a step 401 (CCB CONFIGURATION), the processor 104 programs the configuration value, for example, stored in the register of the coupling and chaining bridge circuit 114. Programming the configuration value allows, for example, to indicate to the coupling and chaining bridge circuit 114 if the next operation to execute is a coupling or chaining operation. For example, programming the configuration value is made based on the type of transmitted access request via the bus 116 by the processor 104 or by the access control circuit to the memory 112. For example, if the access request is a write access request, the configuration value is programmed at the value that specifies a coupling operation, while if the access request is a read access request, the configuration value is programmed at the value that specifies a chaining operation.

In a step 402 (DMA CHANNELS CONFIGURATION) channels of the circuit for direct access to the memory 112 are, for example, configured. For example, a first channel is configured to, in case of coupling, transfer the data value to transfer from the memory 106 or 108 to the register 302. For example, a second channel is configured to, in case of chaining, transfer the data value to transfer from the register 306 to the memory 106 or 108.

In a step 403 (DMA TRANSFERT) after the step 402, the transfer requests by the circuit for direct access to the memory 112 are, for example, executed. For example, write or read access requests are transmitted to the coupling and chaining bridge circuit 114. In the case of a coupling, a data value is written into the register 302, and the same data value is written in parallel into the memory 300 or into the register 304. In the case of a chaining, the data value stored in the register 306 is transmitted, for example, to the bus 110. For example, the data value is intercepted by the coupling and chaining bridge circuit 114 and transmitted to the memory 300 or to the register 304. Then, the circuit for cyclic redundancy code 120 calculates, for example, an error code based on the data value.

In a step 404 (CRC RESULT), the error checking code calculated by the control circuit of cyclic redundancy code 120 is, for example, transmitted to the bus 110 via the coupling and chaining circuit 114 and via the bus 116. For example, the error checking code allows the processor 104 to evaluate whether the data value transmitted to the coupling and chaining circuit 118 comprises wrong bits.

Figure 5A:
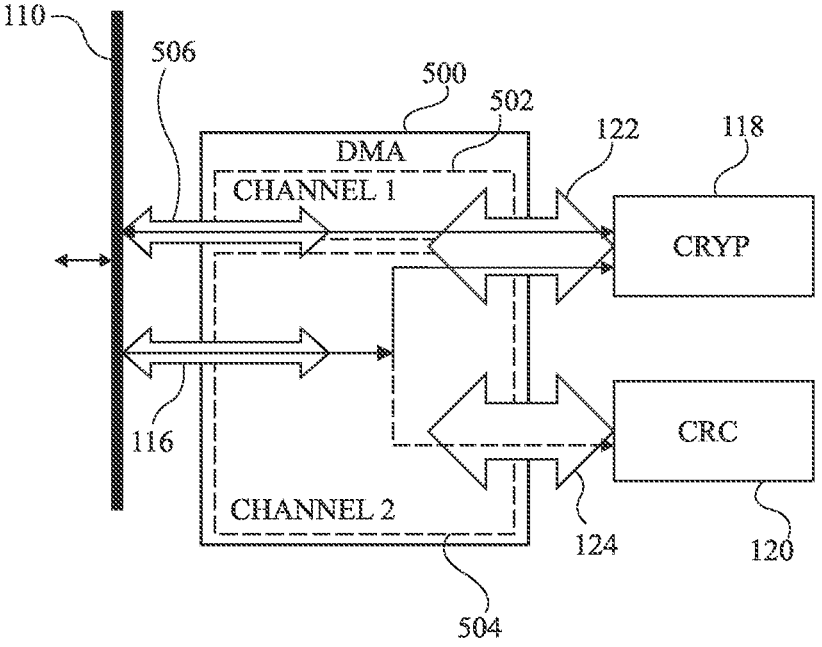
FIG. 5A is a block diagram illustrating another example of implementation of a coupling operation according to an embodiment of the present disclosure.
Figure 5B:
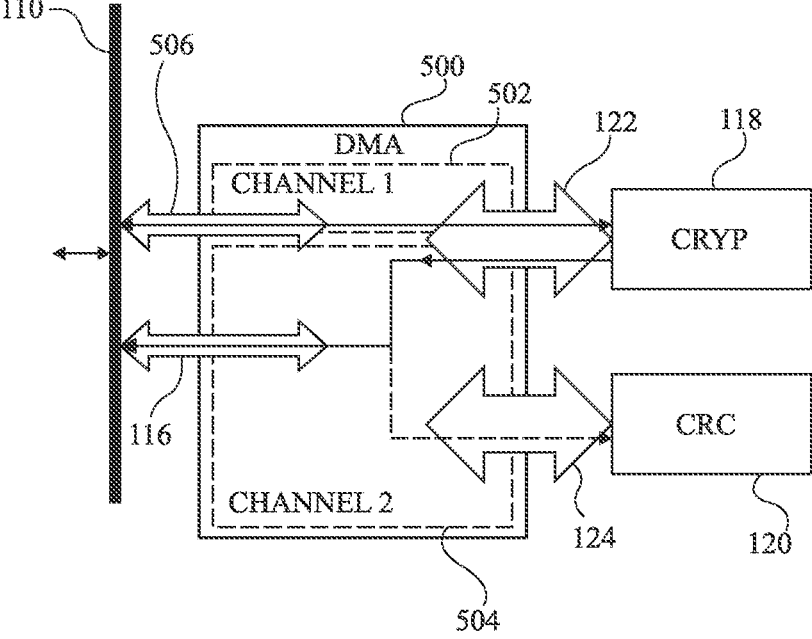
FIG. 5B is a block diagram illustrating another example of implementation of a chaining operation according to an embodiment of the present disclosure.

FIGS. 5A and 5B are block diagrams that illustrate another example of implementation of a coupling operation and a chaining operation according to another embodiment of the present disclosure.

In the example as for FIGS. 5A and 5B, the coupling and chaining bridge circuit 114 is implemented by a circuit for direct access to the memory 500 (DMA). The circuit 500 comprises, for example, a channel 502 (CHANNEL1) and a channel 504 (CHANNEL2). The channel 502 is configured, for example, to link the bus 122 to a bus 506 that is coupled to the bus 110. For example, the channel 502 is used for cryptographic operations without intervention of the control circuit of cyclic redundancy code 120.

For example, the channel 504 is coupled to the circuit 118 via the bus 122 and to the circuit 120 via the bus 124. The channel 504 is further coupled to the bus 110 via the bus 116.

The channel 504 is configured, for example, to implement a coupling or chaining operation, such as described in relationship with FIGS. 2A and 2B.

An advantage of the described embodiments that comprise the combination, at the system level, of the peripheral circuits with a chaining or coupling bridge circuit, is the improvement of performances about the time of treatment and/or that they provide new functions without modifying existing peripherals. Peripheral circuits, such as a cryptographic circuit and a control circuit of cyclic redundancy, or any other peripheral circuit, can be used separately or in combination based on the use mode of the chaining and coupling bridge circuit.

Another advantage of the described embodiments is that they make possible the treatment of a data value by two parallel peripheral circuits. Using the coupling and chaining bridge circuit reduces the surface of the circuit. In addition, during the coupling operation, according to the embodiments of the present disclosure, the data value is transmitted in parallel to the cryptographic circuit and to the control circuit of cyclic redundancy. Similarly, according to the embodiments of the present disclosure, a chaining operation requires only one data transfer request by the processor 104 or by the circuit for direct access to the memory 112. Thus, the described embodiments make it possible to improve the performances of the device in terms of duration of treatment and reduce its power consumption.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove. In particular, the peripheral circuits can be other circuits than a cryptographic circuit and a checking circuit for a cyclic redundancy code. Similarly, the type of bus implementing the buses 116, 122 and 124 and the associated bus protocol may vary.

The invention claimed is:

1. A coupling and chaining bridge circuit configured to receive, via a first bus coupled to one of a system bus of an electronic device and a first peripheral circuit of the electronic device, an original data value and to transmit said original data value to a second bus of the electronic device coupled to the other among the system bus and the first peripheral circuit, the coupling and chaining bridge circuit being further configured to intercept the original data value and transmit a copy of the original data value to a third bus of the electronic device coupled to a second peripheral circuit of the electronic device.

2. The coupling and chaining bridge circuit according to claim 1, further configured to generate a write access request to the second peripheral circuit for the copy of the original data value based on the reception of the original data value.

3. The coupling and chaining bridge circuit according to claim 1, wherein the first bus is coupled to the system bus and the second bus is coupled to the first peripheral circuit, wherein the original data value is transmitted to the coupling and chaining bridge circuit based on a write access request to the first peripheral circuit.

4. The coupling and chaining bridge circuit according to claim 1, wherein the first bus is coupled to the first peripheral circuit and the second bus is coupled to the system bus, wherein the original data value is transmitted to the coupling and chaining bridge circuit based on a read access request to the first peripheral circuit.

5. The coupling and chaining bridge circuit according to claim 1, comprising a volatile memory coupled to the second peripheral circuit, wherein said volatile memory is configured to receive the copy of the transmitted data value and to provide the copy to the second peripheral circuit.

6. The coupling and chaining bridge circuit according to claim 5, wherein the volatile memory is a first in first out memory.

7. An electronic device, comprising:
the coupling and chaining bridge circuit according to claim 1;
the first and second peripheral circuits; and
the system bus.

8. The electronic device according to claim 7, wherein the coupling and chaining bridge circuit is a direct memory access (DMA) circuit.

9. The electronic device according to claim 7, wherein the second peripheral circuit is a cyclic redundancy check circuit configured to calculate an error code based on the data value provided by the coupling and chaining bridge circuit.

10. The electronic device according to claim 7, wherein the first peripheral circuit is a cryptographic circuit.

11. The electronic device according to claim 10, wherein the cryptographic circuit is configured to generate an execution error code indicating whether an execution error occurred.

12. The electronic device according to claim 11, wherein the coupling and chaining bridge circuit further comprises a volatile memory coupled to the second peripheral circuit and configured to receive the copy of the transmitted data value and to provide the copy to the second peripheral circuit, wherein the coupling and chaining bridge circuit is further configured to delete the content of the volatile memory based on the execution error code.

13. The electronic device according to claim 7, further comprising a third peripheral circuit coupled to the coupling and chaining bridge circuit via a fourth bus, wherein the coupling and chaining bridge circuit is further configured to transmit a copy of the original data value to the fourth bus.

14. A process of coupling and chaining, comprising:
receiving, by a coupling and chaining bridge circuit, an original data value via a first bus coupled to one among a system bus of an electronic device and a first peripheral circuit of the electronic device;
transmitting, by the coupling and chaining bridge circuit, the original data value to a second bus of the electronic device coupled to the other among the system bus and the first peripheral circuit;
intercepting, by the coupling and chaining bridge, the original data value; and
transmitting, by the coupling and chaining bridge circuit, a copy of the original data value to a third bus of the electronic device coupled to a second peripheral circuit of the electronic device.

15. The process according to claim 14, further comprising generating, by the coupling and chaining bridge circuit, a write access request to the second peripheral circuit for the copy of the original data value based on the reception of the original data value.

16. The process according to claim 15, further comprising generating, by the coupling and chaining bridge circuit, a write access request to the second peripheral circuit based on a write or read access request in the first peripheral circuit.

17. A coupling and chaining bridge circuit, comprising:

a first bus connection configured to receive an original data value from one of a system bus of an electronic device and a first peripheral circuit of the electronic device;

a second bus connection configured to transmit the original data value to the other among the system bus and the first peripheral circuit;

a third bus connection coupled to a second peripheral circuit of the electronic device; and a circuit configured to intercept the original data value and transmit a copy of the original data value to the third bus connection.

18. The coupling and chaining bridge circuit according to claim 17, further comprising a write access circuit configured to generate a write access request to the second peripheral circuit for the copy of the original data value in response to receipt of the original data value.

19. The coupling and chaining bridge circuit according to claim 17, wherein the first bus connection is made to the system bus and the second bus connection is made to the first peripheral circuit, and wherein the original data value is transmitted in response to a write access request made to the first peripheral circuit.

20. The coupling and chaining bridge circuit according to claim 17, wherein the first bus connection is made to the first peripheral circuit and the second bus connection is made to the system bus, and wherein the original data value is transmitted in response to a read access request made to the first peripheral circuit.

21. The coupling and chaining bridge circuit according to claim 17, further comprising a volatile memory coupled to the second peripheral circuit, wherein said volatile memory is configured to receive the copy of the transmitted data value and to provide the copy to the second peripheral circuit.

22. The coupling and chaining bridge circuit according to claim 21, wherein the volatile memory is a first in first out memory.

* * * * *